Oct. 5, 1954 D. C. HUBBARD Re. 23,885

INSULATOR SUPPORTING PIN AND COB

Original Filed April 10, 1948

Inventor
David C. Hubbard
By Robert H. Kent
Attorney

Reissued Oct. 5, 1954

Re. 23,885

UNITED STATES PATENT OFFICE 23,885

INSULATOR SUPPORTING PIN AND COB

David C. Hubbard, Centralia, Mo., assignor to A. B. Chance Company, Centralia, Mo., a corporation of Missouri Original No. 2,592,698, dated April 15, 1952, Serial No. 20,179, April 10, 1948. Application for reissue March 23, 1953, Serial No. 344,261

6 Claims. (Cl. 174—205)

Matter enclosed in heavy brackets [ ] appears in the original patent but forms no part of this reissue specification; matter printed in italics indicates the additions made by reissue.

The present invention relates to insulator supporting pins and cobs, and is particularly concerned with the provision of improved forms of pins and cobs by means of which one may eliminate the use of lead, now used for cobs, and of which there is a critical shortage.

One of the objects of the invention is the provision of an improved construction of insulator supporting pins and cobs by means of which the lead, which is now being used for cobs on steel pins, may be eliminated and improved structure provided which has marked advantages over the prior art.

Another object of the invention is the provision of an improved insulator supporting structure comprising a steel pin, which may be of the type used for steel cross arms, wooden cross arms, or pole ends, and which is adapted to be used with a cob constructed of a suitable modern plastic, which is adapted to be secured tightly to the pin and to the insulator, when the insulator is driven home on the cob.

Another object of the invention is the provision of an improved removable cob for steel insulator supporting pins, which is adapted to be made of any one of a class of modern plastics, the electrical conducting characteristics of which may be suitably modified so as to provide a static drain for the charge, which might otherwise accumulate on the inside of the insulator, thus removing a possible source of radio interference.

Another object of the invention is the provision of an improved removable cob for the steel insulator pins used to support insulators on telephone and transmission lines, which is simple in construction, and which is provided with anchoring formations having a suitable clearance with complementary anchoring formations on the pin so that the cob can be forced on the pin, and also having the characteristic of being deformed and brought into tight engagement with the anchoring formations on the pin when the insulator is threaded on the cob.

Another object of the invention is the provision of removable and attachable cobs for steel insulator supporting pins which are tough and strong, of suitable insulating characteristics, noninflammable, capable of being roughly handled or subjected to some abuse without substantial damage, capable of economical manufacture, and adapted to be made as a unit apart from the pin so that it will not be necessary to fabricate the pins and ship them to the plant which molds cobs, as is necessary when the cobs are molded on the ends of the pins.

Other objects and advantages of the invention will be apparent from the following description and the accompanying drawings, in which similar characters of reference indicate similar parts throughout the several views.

Referring to the single sheet of drawings accompanying the specification.

The cobs embodying the present invention are preferably made out of a suitable plastic, such as polyethylene, cellulose acetate butyrate, polyvinyl chloride, nylon, or the like; and the preferred plastic material is cellulose acetate butyrate on account of its cheapness and plentiful supply.

In order to prevent a static charge being built up on the under side of the insulator, due to the different dielectric properties of the insulator and the cob, the electrical conducting characteristics of the plastic are preferably modified by incorporating an electrical conducting material, such as carbon dust; or the plastic may be coated or painted with a conductive paint coating of similar material.

Figure 1:
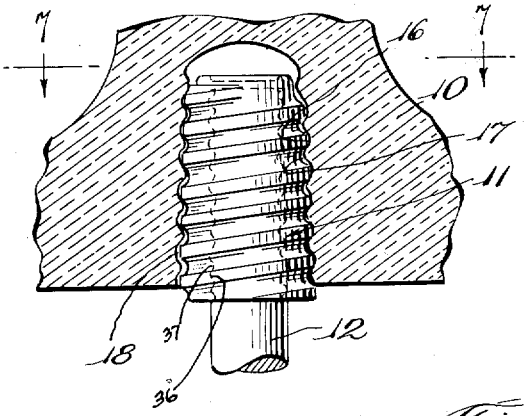
Fig. 1 is a fragmentary side elevational view showing a fragment of an insulator and a steel pin equipped with a cob embodying the invention, the cob being shown in elevation.
Figure 2:
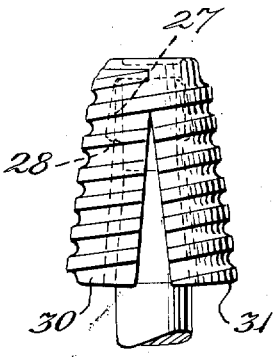
Fig. 2 is a modification showing a split type of cob in connection with a steel pin, the cob being applicable to the pin in the split condition, and being brought into tight engagement with the pin by the insulator, which draws the split parts of the cob together on the anchoring formations of the pin.
Figure 4:
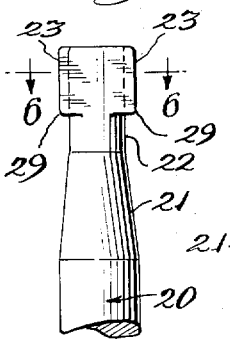
Fig. 4 is a fragmentary elevational view of the end of a steel pin of the type adapted to be used with the cob of Fig. 3.
Figure 5:
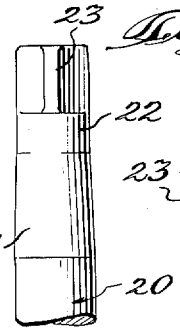
Fig. 5 is a fragmentary side elevational view of the pin of Fig. 4.
Figure 3:
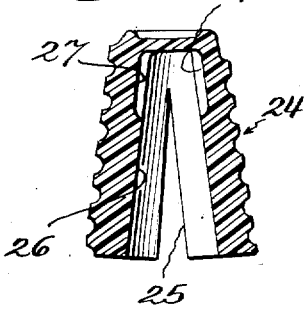
Fig. 3 is an axial sectional view taken through the cob of Fig. 2 on a plane passing through the anchoring cavities.
Figure 6:
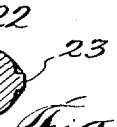
Fig. 6 is a horizontal sectional view taken on the plane of the line 6—6 of Fig. 4, looking in the direction of the arrows.

Referring to Fig. 1, 10 indicates an electrical insulator which is mounted upon a cob 11 carried by a steel pin 12. The lower part of the steel pin 12 may be substantially the same as the steel pins of the prior art, which are provided with a non-circular wrench-engaging portion, an annular skirt, and a reduced cylindrical threaded end portion having a nut (not shown).

The steel pin 12 may have its upper end provided with threads similar in size and shape to the threads usually employed upon wooden pins, and complementary to the threads on the inside of the cob 11, as indicated by dotted lines at 36 in Figure 1. These threads 37, on the pin 12, engaging the threads 36 on the inside of the cob 11, may be regarded as one form of anchoring formations.

Figure 7:
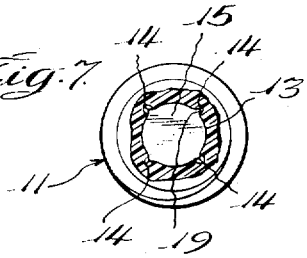
Fig. 7 is a top plan view of the cob and pin of Fig. 8.

Referring now to Figure 7, the steel pin 12 may, in this modification, have its upper cylindrical end 13 provided with a plurality of radially projecting and longitudinally extending ribs 14, which may be substantially V-shaped in cross-section. The ribs 14 extend from the top 15 of the pin to a point short of the end of the cob, after the cob has been applied. The size of the ribs 14 is preferably such that a cob with an under sized bore and grooves complementary to the ribs 14 may be forced over the upper end 13 of the pin, the plastic cob stretching and deforming slightly.

The insulator 10 may be provided with an under sized hole 16 slightly tapered from the bottom to the top and provided with oversized threads 17 relative to the threads on the cob. The size of the hole in the cob and its grooves for the ribs 14 is preferably such that when the cob is forced on the end of the pin, it is held against rotation by the ribs 14 and complementary grooves 19 in the cob.

Therefore, the cob does not tend to rotate on the pin when the insulator is applied; and the tapered threaded bore of the insulator is adapted to compress the deformed cob as the insulator progresses downwardly on the cob until the ribs 14 are firmly embedded on the inside of the cob and the cob is secured against rotation or axial movement on the pin 12.

Since the ribs 14 on the pin and the grooves 19 in the cob terminate short of the lower end of the cob, thus there is plastic material engaging the lower ends of the ribs 14, particularly after the insulator has been driven tightly on the cob.

Referring to Figs. 2 to 6, these show a modification in which the cob is provided with a split; and the anchoring formations on the pin and complementary depressions in the cob may be made correspondingly larger.

In this case the pin 20 is reduced in size at 21, being provided with a frusto-conical portion and a reduced upper cylindrical portion 22, the upper cylindrical portion 22 having radially projecting short ribs 23, which extend longitudinally of the pin and are oppositely located.

The cob 24 of plastic, when its split ends are brought into engagement with each other, so that the split 25 disappears, is of a size substantially complementary to the upper end of the pin, having a bore 26 complementary to the outer shape of the pin at 21 and 22.

At its upper end the bore has the two oppositely located grooves 27, which are complementary in shape to the ribs 23 on the pin.

The operation of this embodiment is as follows: The split 25 is exemplified by two V-shaped grooves extending longitudinally into the two diametrically opposite sides of the cob at 25. This spreads the skirts of the cob 24 sufficiently so that the lower corner 28 of the grooves 27 clears the lower corner 29 of the ribs 23 on each side of the pin.

The operator may then apply the insulator, and the cob is held against rotation by the engagement of the upper portions of the ribs 23 in the upper portions of the grooves 27. Here again the threaded bore in the insulator may be undersized and/or provided with oversized threads in relation to the threads on the tapered external part of the cob when it is compressed together.

As the insulator progresses downwardly on the threads of the cob, the two split end portions 30 and 31 will be forced together, closing the splits at 25 and drawing the grooves or recesses 27 closely about the ribs 23.

Thus the cob will be securely anchored against rotation or longitudinal movement on the pin.

Figure 8:
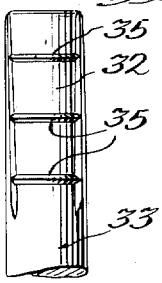
Fig. 8 is a fragmentary side elevational view of the top end of a modified form of pin.
Figure 9:
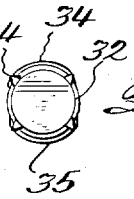
Fig. 9 is a top plan view of the modified pin of Fig. 8.

Referring to Figs. 8 and 9, this is a modified form of pin similar to Fig. 7 except that the two opposite sides of the upper end portion 32 of the pin 33 are provided with peripherally extending ribs 34, 35. The upper end portion 32 of the pin may be substantially cylindrical; and it may have the same longitudinally extending, equally spaced ribs 14 as the pin of Fig. 7. In addition, it has the peripherally extending V-shaped ribs 34 and 35 on the opposite sides.

These cross ribs 34, 35 engage annular grooves in the cobs or are embedded into the cob wall to lock the cob on the pin when the insulator is installed; and the tapered undersized bore and/or oversized threads on the inside of the insulator tend to compress the tapered cob on the pin.

The cob in this case may be substantially the same as the cob 11 of Fig. 1 except that it may have partially annular grooves complementary to the peripherally extending ribs 34, 35.

It will thus be observed that I have invented an improved cob for mounting insulators on steel pins, which has the following advantages:

1. The cob is detachable and replaceable, and may be manufactured apart from the steel pin.
2. The cob is self-locking on the steel pin.
3. The cob is semi-plastic, semi-conducting, and molded so that its size and proportions may be made suitable for a steel pin of complementary external shape.
4. The shape of the steel pin is such that it may be easily forged.
5. The use of such cobs made of a modern plastic conserves lead used on steel for cobs, of which there is critical shortage.
6. The use of the present cobs will be economical, as cellulose acetate butyrate, which is preferred, is no more expensive than lead; and this plastic is plentiful in supply.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an insulator supporting pin, the combination of a metal pin having means for attachment to a cross-arm or the like, said pin having a substantially cylindrical upper end provided with anchoring formations thereon, a separate sleeve of cellulose acetate butyrate [molded to be] provided with an internal bore substantially complementary in shape to the end of the pin and its anchoring formations, and having on its exterior surface threaded formations complementary to those on the inside of a glass insulator, the said anchoring formations securing the sleeve on the pin when the glass insulator is driven home on the threaded formations which are provided on the exterior of the sleeve, the said sleeve being provided with a pair of diametrically opposite slits in its sides extending over the major portion of the length of the sleeve and permitting its opposite lower parts to be spread for engagement over the pin with its anchoring formations, the application of the insulator to the external threads of the sleeve causing the slits to close and the side portions of the sleeve to approach each other, to clamp the anchoring formations more firmly.

2. In an insulator supporting pin, the combination of a metal pin having means for attachment to a cross-arm or the like, said pin having a substantially cylindrical upper end provided with anchoring formations thereon, a separate sleeve of cellulose acetate butyrate [molded to be] provided with an internal bore substantially complementary in shape to the end of the pin and its anchoring formations, and having on its exterior surface threaded formations complementary to those on the inside of a glass insulator, the said anchoring formations securing the sleeve on the pin when the glass insulator is driven home on the threaded formations which are provided on the exterior of the sleeve, the said sleeve being provided with a pair of diametrically opposite slits in its sides extending over the major portion of the length of the sleeve and permitting its opposite lower parts to be spread for engagement over the pin with its anchoring formations, the application of the insulator to the external threads of the sleeve causing the slits to close and the side portions of the sleeve to approach each other, to clamp the anchoring formations more firmly, the said anchoring formations comprising threads formed on the pin which are complementary to internal threads formed on the inside of the sleeve.

*3. In an insulator supporting pin, the combination of a metal pin having means for attachment to a cross-arm or the like, said pin having a round end provided with anchoring formations thereon, a separate sleeve of plastic, provided with an internal bore substantially complementary in shape to the end of the pin and its anchoring formations, and having on its exterior surface, threaded formations complementary to those on the inside of an insulator, the said anchoring formations securing the sleeve on the pin when the insulator is driven home on the threaded formations which are provided on the exterior of the sleeve, the said sleeve being provided with a longitudinally extending slit in its side extending over the major portion of the lentgh of the sleeve and permitting its parts to be spread for engagement over the pin with its anchoring formations, the application of the insulator to the external threads of the sleeve causing the slit to close and the side portions of the sleeve to approach each other to clamp the anchoring formations more firmly.*

*4. In an insulator supporting pin, the combination of a metal pin having means for attachment to a cross-arm or the like, said pin having a round upper end provided with anchoring formations thereon, a separate sleeve of plastic, provided with an internal bore substantially complementary in shape to the end of the pin and its anchoring formations, and having on its exterior surface, threaded formations complementary to those on the inside of an insulator, the said anchoring formations securing the sleeve on the pin when the insulator is driven home on the threaded formations which are provided on the exterior of the sleeve, the said sleeve being provided with a longitudinally extending slit in its side extending over the major portion of the length of the sleeve and permitting its parts to be spread for engagement over the pin with its anchoring formations, the application of the insulator to the external threads of the sleeve causing the slit to close and the side portions of the sleeve to approach each other to clamp the anchoring formations more firmly, the said anchoring formations comprising threads formed on the pin which are complementary to internal threads formed on the inside of the sleeve.*

*5. An insulator supporting cob for mounting a line insulator on a metal cross-arm pin, having an upper end provided with anchoring formations, comprising an integral sleeve of plastic which is tapered toward its upper end and provided with external threads substantially complementary to the threads on the inside of said insulator, the said cob being provided on its inside with anchoring formations which are complementary to those on the upper end of the metal pin with which it is to be used, the said cob having a slit extending longitudinally of one of the sides of the sleeve from the bottom of the cob upward over the major portion of the length of the cob, so that the sides of the cob sleeve can be spread apart by widening said slit mechanically to separate the internal anchoring formations of said cob until they pass over the anchoring formations on the metal pin and the sides of the cob, when spread part, are caused to move together and resume their former round shape by securing an insulator on the external threads of said cob, also effecting a tight anchorage of the cob on the anchoring formations of the metal pin.*

*6. An insulator supporting cob for mounting a line insulator on a metal cross-arm pin, having an upper end provided with anchoring formations, comprising an integral sleeve of plastic which is tapered toward its upper end and provided with external threads substantially complementary to the threads on the inside of said insulator, the said cob being provided on its inside with anchoring formations which are complementary to those on the upper end of the metal pin with which it is to be used, the said*

*cob having a slit extending longitudinally of one of the sides of the sleeve from the bottom of the cob upward over the major portion of the length of the cob, so that the sides of the cob sleeve can be spread apart by widening said slit mechanically to separate the internal anchoring formations of said cob until they pass over the anchoring formations on the metal pin and the sides of the cob, when spread apart, are caused to move together and resume their former round shape by securing an insulator on the external threads of said cob, also effecting a tight anchorage of the cob on the anchoring formations of the metal pin, the said anchoring formations on the metal pin and those inside the cob comprising threaded formations which are complementary to each other.*

References Cited in the file of this patent or the original patent

UNITED STATES PATENTS

| Number | Name | Date |
|---|---|---|
| 268,075 | Brown | Nov. 28, 1882 |
| 436,120 | Chubbuck | Sept. 9, 1890 |
| 701,246 | Baily | May 27, 1902 |
| 875,902 | Egner | Jan. 7, 1908 |
| 1,122,030 | Sandford | Dec. 22, 1914 |
| 1,912,007 | Plimpton et al. | May 30, 1933 |
| 2,297,600 | Williams | Sept. 29, 1942 |

FOREIGN PATENTS

| Number | Country | Date |
|---|---|---|
| 356,299 | Germany | July 25, 1922 |
| 389,253 | Great Britain | Mar. 16, 1933 |